Oct. 21, 1930.  D. R. BOMFORD ET AL  1,779,158
ADJUSTABLE CULTIVATOR
Filed May 28, 1929  3 Sheets-Sheet 1

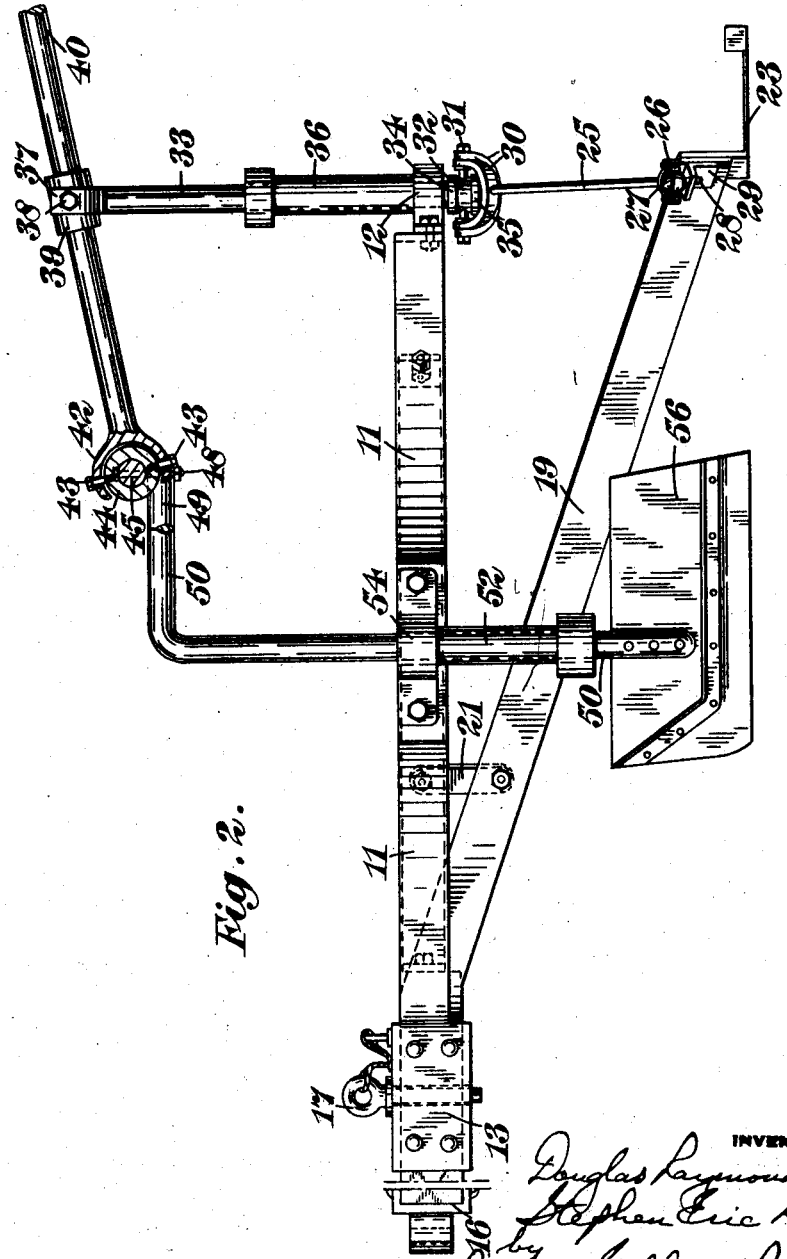

Oct. 21, 1930.  D. R. BOMFORD ET AL  1,779,158
ADJUSTABLE CULTIVATOR
Filed May 28, 1929   3 Sheets-Sheet 3

Patented Oct. 21, 1930

1,779,158

UNITED STATES PATENT OFFICE

DOUGLAS RAYMOND BOMFORD, OF EVESHAM, AND STEPHEN ERIC ALLEY, OF LONDON, ENGLAND

ADJUSTABLE CULTIVATOR

Application filed May 28, 1929, Serial No. 366,648, and in Great Britain June 6, 1928.

This invention is for improvements in or relating to adjustable cultivators, and it has for one of its objects to provide a machine which is capable of hoeing the ground very closely around spaced plants, such, for example, as strawberry plants, while the machine is being traversed along the surface of the ground.

According to the primary feature of the present invention, there is provided a horse- or traction-hoe or like machine comprising a pair of cutters arranged side-by-side so as to work adjoining strips of ground, and each having a continuous edge, lying transversely of the direction of travel of the vehicle, whereof the normal working position is below the surface of the ground, and means for moving the cutters relatively to each other transversely of the direction of travel of the machine to create and close a gap between the cutters at the location of which a strip of ground traversed by the machine will be left unworked, which cutters are so arranged that when the gap is closed the two cutting edges are approximately continuous throughout the whole width of the ground then being worked. Hence, as the machine proceeds along a row of plants, the gap can be created when the cutters have reached a plant, and can be closed again when the cutters have passed that plant, and in this way the awkward operation of working the soil between the plants in the row is accomplished. Moreover, the machine according to the present invention will be able to work the soil very closely around the plants without touching the latter.

It is a feature of the invention to arrange that the cutters shall be maintained in operative position to work the ground both when the gap is created and when it is closed. In this way, the machine can be arranged to hoe or otherwise work the soil very closely around the plants, not only at the sides of the rows, but also between adjacent plants, thus completing the work which may have been commenced by a machine which has passed along the furrows between adjacent rows of plants.
The cutters may be of various construc-
tions, according to the work which is to be accomplished.

Conveniently, the cutters are carried at the lower ends of spring-levers depending from the frame of the machine and controlled by spreaders. The machine may have a tiller-bar for guiding it, and this bar may be arranged for vertical movement, and be coupled to the cutters to create and close the gap between them by such vertical movement.

For a more complete understanding of the invention, there will now be described, by way of example only, and with reference to the accompanying drawings, one constructional form of hoeing machine according to the invention. It is to be understood, however, that the invention is not restricted to the precise constructional details set forth.

In these drawings—

Figure 2 is a side elevation of certain of the parts shown in Figure 1, but is on a scale larger than that of Figure 1;

Like reference numerals indicate like parts throughout the drawings.

Figure 1:
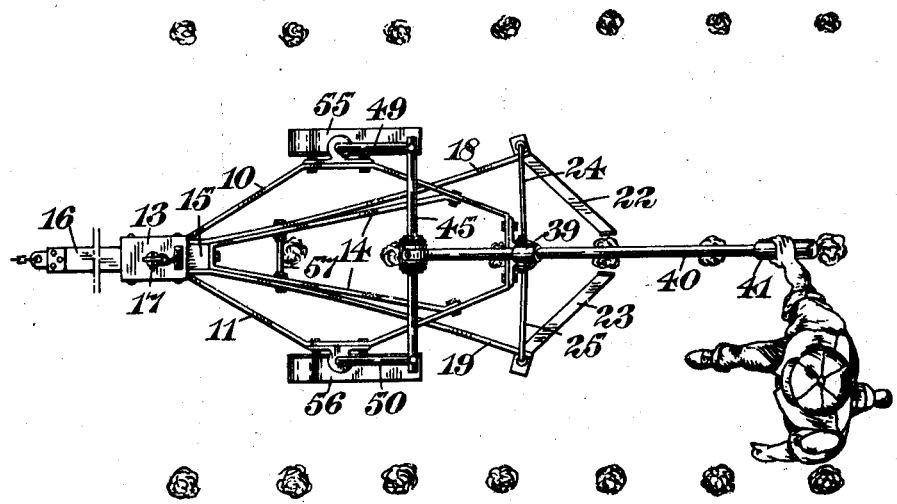
Figure 1 is a plan of the machine, showing it in use for hoeing the soil around rows of plants.
Figure 3:
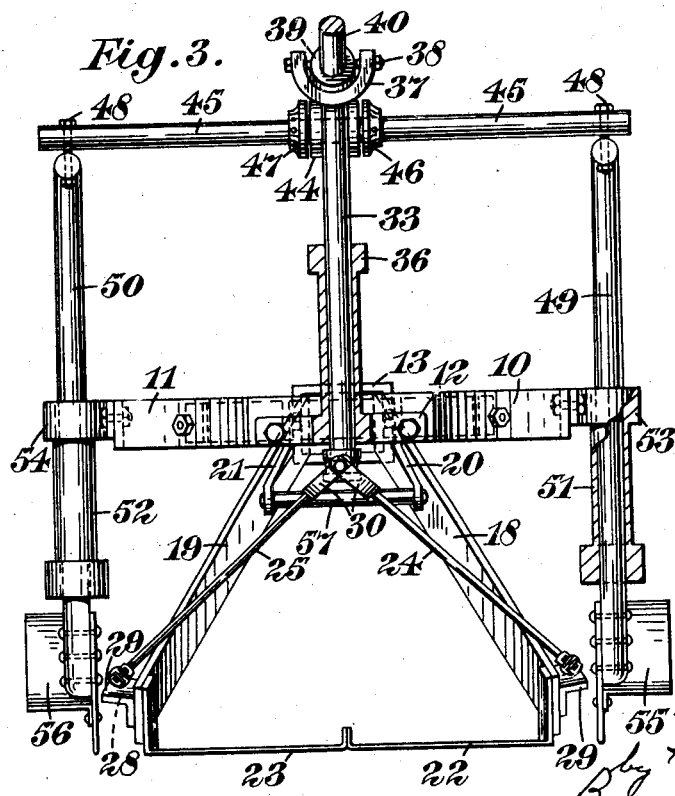
Figure 3 is an end elevation of the parts shown in Figure 2.
Figure 4:
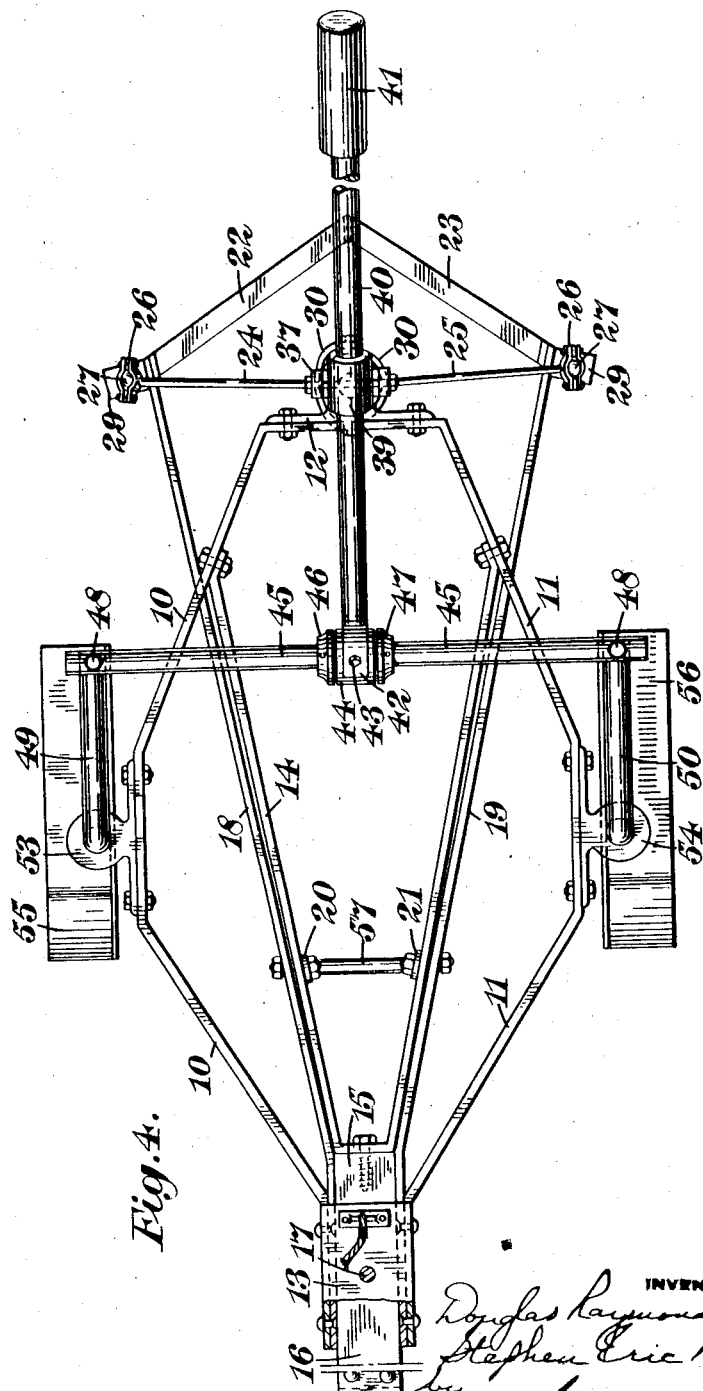
Figure 4 is a plan.

The machine comprises a main framework composed of two outer frame-members 10 and 11 which are coupled together at the rear end of the machine by a bracket 12, and at the front of the machine by a socket 13. There is also a stiffening member 14 which is attached to the members 10 and 11, and is also secured to a block of wood 15 located at the rear of the socket 13. The latter receives a draught pole 16, which may be secured in place by a detachable pin 17 reaching through the pole and through the socket 13.

Also secured to the socket 13 are two spring-levers 18 and 19, these levers being also secured to the block 15. The levers 18 and 19 extend rearwardly and downwardly from the socket 13, and are supported from the arms of the stiffening member 14 by links 20 and 21. At the location of the links 20 and 21 the spring-levers 18 and 19 are also connected by a tie-bar 57. At their lower ends the levers 18 and 19 have attached to them cutters 22 and 23 which, when closed together, meet at the longitudinal centre line of the machine and form one continuous edge. The resilience of the levers 18 and 19 tends to close the cutters towards each other, but spreader rods 24 and 25 are provided for opening out the levers 18 and 19 when necessary. At their lower ends each of the rods 24 and 25 has a casing 26 enclosing a ball 27 carried on a stem 28 extending upwardly from a bracket 29 on the respective spring-lever 18 or 19. Thus there is a universal-joint between each of the rods 24 and 25 and their respective spring-levers. At their upper ends each rod 24, 25 has a yoke 30 which is pivoted upon trunnions 31 extending from a ring 32 which is mounted on the lower end of a vertical slidable stem 33 between two stop-collars 34 and 35. Thus, the ring 32 is free to turn on the stem 33 so that a universal-joint connection is provided between each spreading rod 24 and 25 and the stem 33. Downward movement of the stem 33 will cause the spreading rods 24 and 25 to move the cutters apart, and upward movement of the stem 33 will permit the spring-levers 18 and 19 to close the cutters together again.

The stem 33 is guided in a pillar 36 carried by the bracket 12, and at the upper end of the stem 33 there is a yoke 37 which is pivoted by a pin 38 to a sleeve 39 on a tiller-rod 40. This tiller-rod 40 has at its rearward end a handle 41 to be grasped by the operator, and at its forward end it has a yoke 42 which is pivotally secured by studs 43 to a sleeve 44 which is loosely mounted on a cross-bar 45 between two stop-collars 46 and 47. The ends of the cross-bar 45 are connected by bolts 48 to the rearward ends of two cranked steering rods 49 and 50. Each steering rod is guided in a vertical pillar 51 and 52 respectively, these pillars depending from the undersides of brackets 53 and 54 secured to the frame-members 10 and 11. At their lower ends, the steering rods 49 and 50 have tiller-blades 55 and 56 which run on the ground and ensure that the machine shall travel along the proper course, they being deflected, as necessary, by appropriate movements of the tiller-bar 40. As illustrated, the parts are so arranged that the operator moves the tiller-bar in the direction in which he wishes the machine to swerve or turn.

To spread the cutters apart, i. e. to create the gap aforesaid, the operator merely has to depress his end of the tiller-bar, while if he raises this end the cutters will close the gap again. The action is immediate, and consequently the operator will be able to work the soil closely around the plants over which the machine is traversed. When the cutters are spread apart, they still continue to work the soil, and the operator will thus be easily able to work closely around the plants, whether the same are planted at regular or irregular intervals.

Any suitable construction of cutter-bar and any suitable setting thereof can be adopted according to requirements.

It is to be understood that the invention is not restricted to the precise constructional details set forth. For instance, instead of the machine being drawn through a draught pole, it may be provided with its own motor. Alternatively, a number of machines may be arranged side-by-side or in staggered order, and be traversed over the ground by a single tractor.

We claim—

1. A hoe comprising a frame, a steering member mounted in said frame to turn about a substantially vertical axis, a tiller-bar mounted on the frame for movement about a horizontal and a vertical axis, an operative connection between the steering member and the tiller-bar whereby movement of the tiller-bar about its vertical axis will cause the steering member to turn about its axis, a pair of spring-levers depending from the frame, a pair of cutters, each having a continuous cutting edge lying transversely of the direction of travel of the machine and carried one at the lower end of each spring-lever in such manner that their cutting edges are approximately continuous throughout the whole width of the ground then being worked, and a pair of spreaders operatively connected to the tiller-bar and one to each cutter and so arranged that movement of the tiller-bar about said horizontal axis will move the cutters relatively to each other transversely of the machine to create a gap between them at the location of which a strip of ground traversed by the machine will be left unworked.

2. A hoe comprising a frame, a pair of steering blades supporting the frame, a tiller-bar operatively connected to said blades and movable in a horizontal direction to guide the machine, a pair of spring-levers depending from the machine, a pair of cultivating tools, carried one at the lower end of each spring-lever, arranged side by side to work adjoining strips of ground and each having a continuous edge, lying transversely of the length of the machine, the normal working position of which edges is below the surface of the ground and which edges are substantially continuous, and a pair of spreaders operatively connecting the tiller-bar to the cutters and arranged so that vertical movement of the tiller-bar will cause the cutters to move apart with their cutting edges still below the level of the ground to create a gap between them.

3. An adjustable cultivator comprising in combination a frame, a pair of cutters arranged side by side and having each a continuous cutting edge, the normal working position of which edges is below the surface of the ground, resilient means comprising two members that depend from the frame and carry each one of the cutters in a position in which the two cutting edges are approximately continuous, spreading means operatively connected to the cutters for moving them apart to create a gap between them at the location of which a strip of ground traversed by the cultivator will be left unworked, and a single operating member arranged to actuate said spreading means.

4. An adjustable cultivator comprising in combination a frame, a pair of cutters arranged side by side and having each a continuous cutting edge, the normal working position of which edges is below the surface of the ground, resilient means comprising two members that depend from the frame and carry each one of the cutters in a position in which the two edges are approximately continuous, a steering member carried by the frame, a tiller bar operatively connected to said steering member, and spreading means controlled by said tiller bar and operatively connected to the cutters for moving them apart to create a gap between them at the location of which a strip of ground traversed by the cultivator will be left unworked.

In testimony whereof we have signed our names to this specification.

DOUGLAS RAYMOND BOMFORD.
STEPHEN ERIC ALLEY.